June 12, 1962  L. G. SUGGS ETAL  3,038,492
AUTOMATIC COFFEE BREWER

Filed May 31, 1957  5 Sheets-Sheet 1

INVENTORS
Lee G. Suggs and
Ernest N. Martin
BY Fulwider, Mattingly
and Huntley  ATTORNEYS

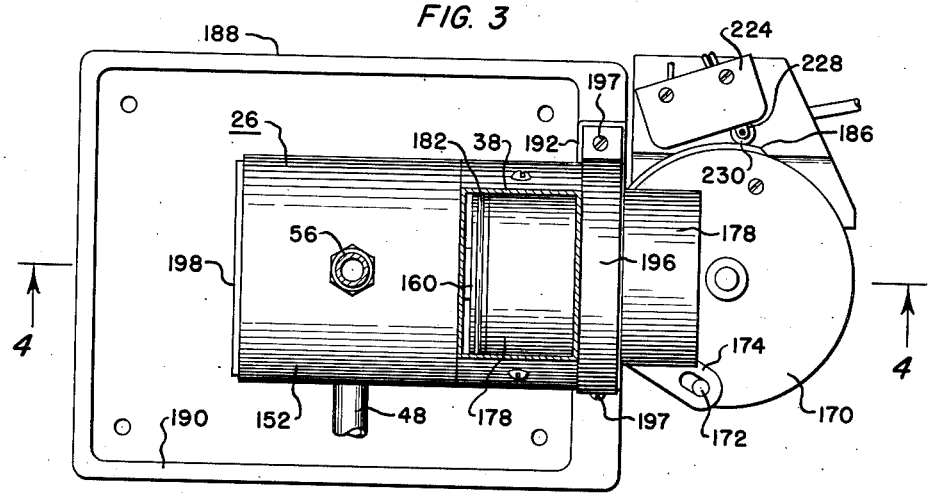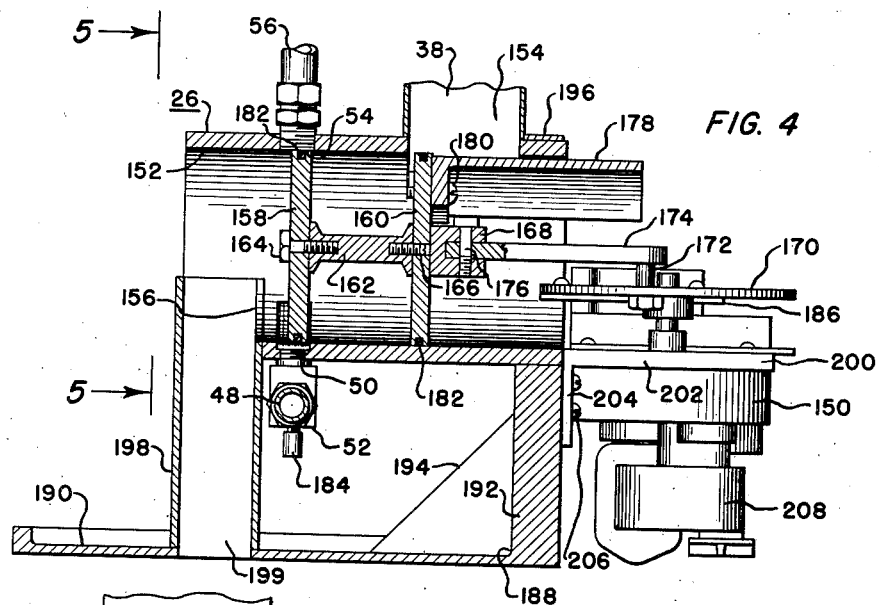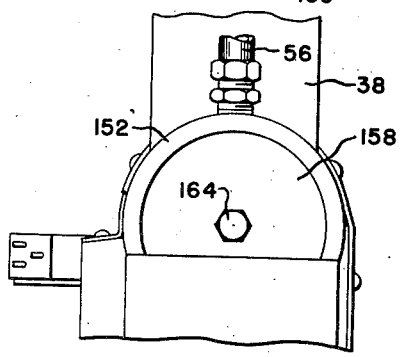

June 12, 1962   L. G. SUGGS ETAL   3,038,492
AUTOMATIC COFFEE BREWER

Filed May 31, 1957   5 Sheets-Sheet 3

INVENTORS
Lee G. Suggs and
BY Ernest N. Martin
Fulwider, Mattingly
and Huntley   ATTORNEYS June 12, 1962  L. G. SUGGS ETAL  3,038,492
AUTOMATIC COFFEE BREWER Filed May 31, 1957  5 Sheets-Sheet 4

INVENTORS
Lee G. Suggs and
Ernest N. Martin
BY
Fulwider, Mattingly
and Huntley ATTORNEYS June 12, 1962   L. G. SUGGS ETAL   3,038,492
AUTOMATIC COFFEE BREWER
Filed May 31, 1957   5 Sheets-Sheet 5
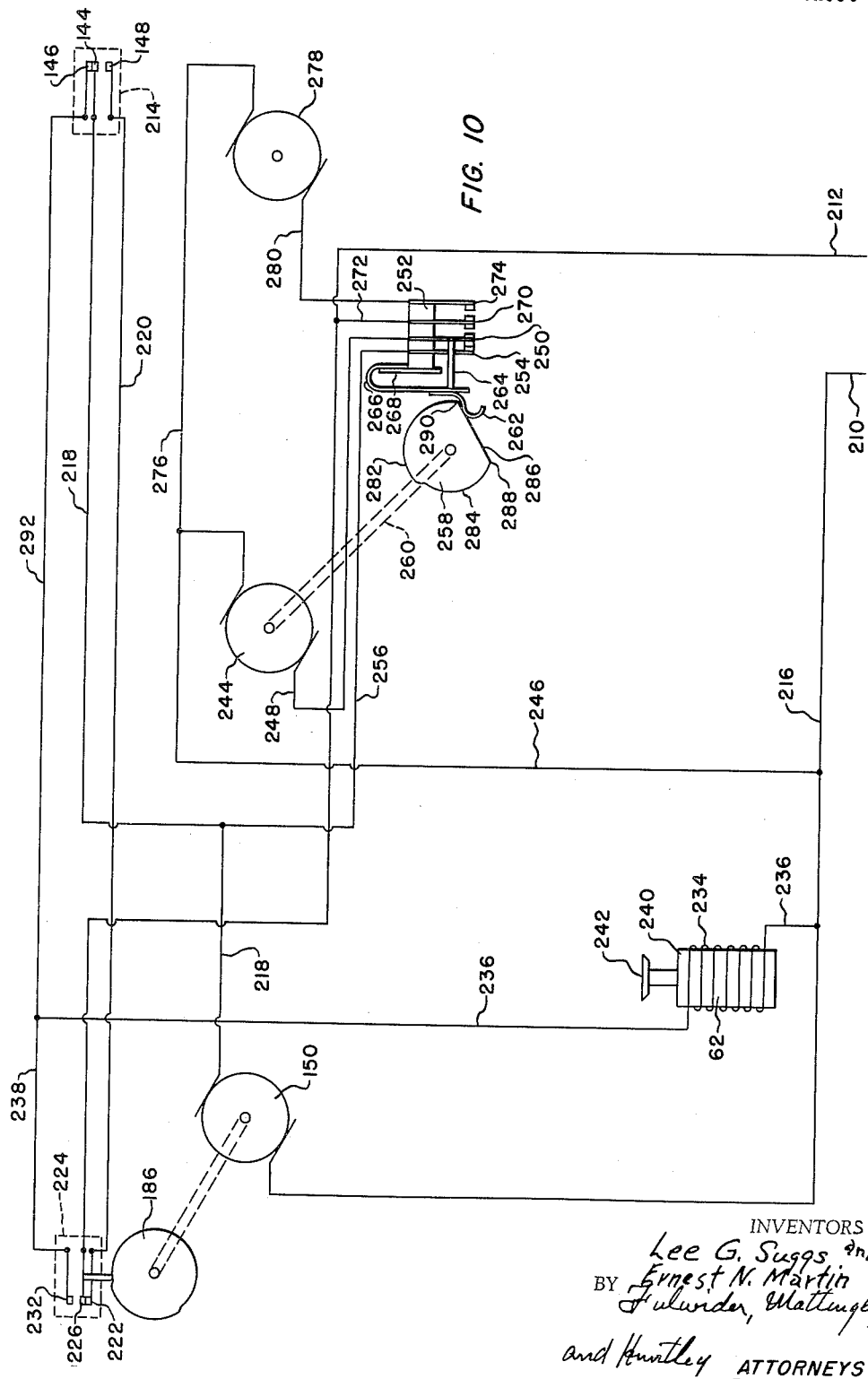

United States Patent Office 3,038,492
Patented June 12, 1962

3,038,492
AUTOMATIC COFFEE BREWER
Lee G. Suggs and Ernest N. Martin, Escondido, Calif., assignors to Barmart, San Marcos, Calif., a partnership consisting of S. Morgan Barber and Ernest N. Martin
Filed May 31, 1957, Ser. No. 662,744
6 Claims. (Cl. 137—453)

The present invention relates to a brewing machine and more particularly to an automatic brewing machine for brewing coffee, tea, etc.

In practicing the instant invention, I utilize mechanism or means including a pivotally mounted container which is adapted to receive brewed coffee; this mechanism or means is so shaped that the center of gravity thereof, when the container is empty, is below the center of gravity thereof when the container is filled or substantially filled with coffee; the pivot for this mechanism is disposed between the two centers of gravity whereby when the container is empty and while receiving coffee up to a predetermined height therein, the container is in a coffee receiving position, but, after the fluid level in the container reaches a predetermined height, the container will be upset. This brewed coffee is dumped into a storage tank, from which tank the coffee is withdrawn as needed. When the level in the tank falls sufficiently to permit air to enter into the upset container, coffee will flow from the container and the container will remain in upset position until sufficient coffee is withdrawn from the container to shift the center of gravity of the container to a position in which the container will move from its upset position to its coffee receiving position. I utilize these movements of the container to control automatically the various elements of the brewing machine.

The coffee or tea brewer of the present invention is connected with a supply of ground coffee. This brewer includes a cylinder having an inlet port for receiving ground coffee from the aforementioned supply, an inlet port for hot water, used in brewing the coffee, an outlet port for brewed coffee, and an outlet for spent coffee. Two axially spaced pistons are slideably mounted in the cylinder; these pistons are moved by a motor into several stations or positions with respect to the ports. These stations or positions include (1) a fresh ground receiving position in which the space between the pistons is connected with the supply of coffee, (2) a coffee brewing station in which the space between the pistons is connected with the hot water inlet and the brewed coffee outlet ports and in which station such space is isolated from the coffee inlet port and the spent coffee outlet port, and (3) a spent coffee grounds flushing station in which the space between the pistons is connected with the hot water inlet port and the spent grounds outlet port, and in which position the space is isolated from the fresh ground inlet port.

In the automatic operation of my machine, I utilize the tilting movements of the aforementioned brewed coffee receiving container for controlling the motor's sequence of movement from position to position, and control the flow, that is the starting and stopping, of water to the brewer.

Further objects and advantages will be apparent from the following description, reference being had to the accompanying drawings wherein a preferred embodiment of the invention is illustrated.

In the drawings:

FIG. 3 is a view taken along line 3—3 of FIG. 1 but on a larger scale;

FIG. 4 is a sectional view taken on line 4—4 of FIG. 3;

FIG. 5 is a view looking in the direction of arrows 5—5 of FIG. 4;

FIG. 10 is a diagrammatic view of the electrical system employed in controlling the system.

Figure 1:
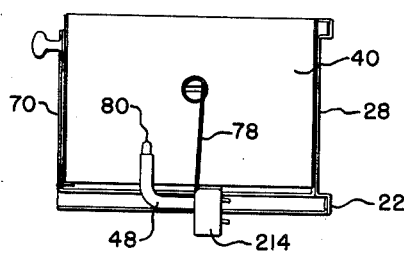
FIG. 1 is a top plan view of the improved brewing machine.
Figure 2:
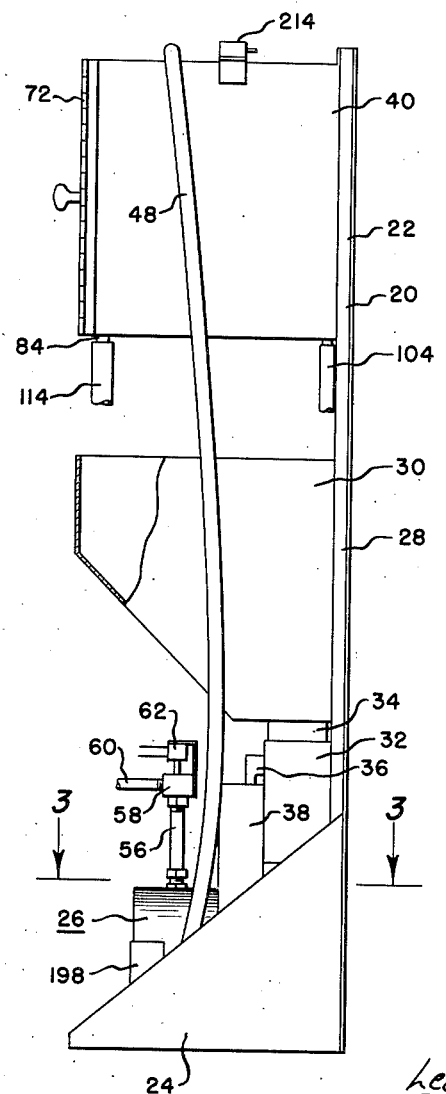
FIG. 2 is a side view of the machine, part of the coffee hopper being shown in section.
Figure 6:
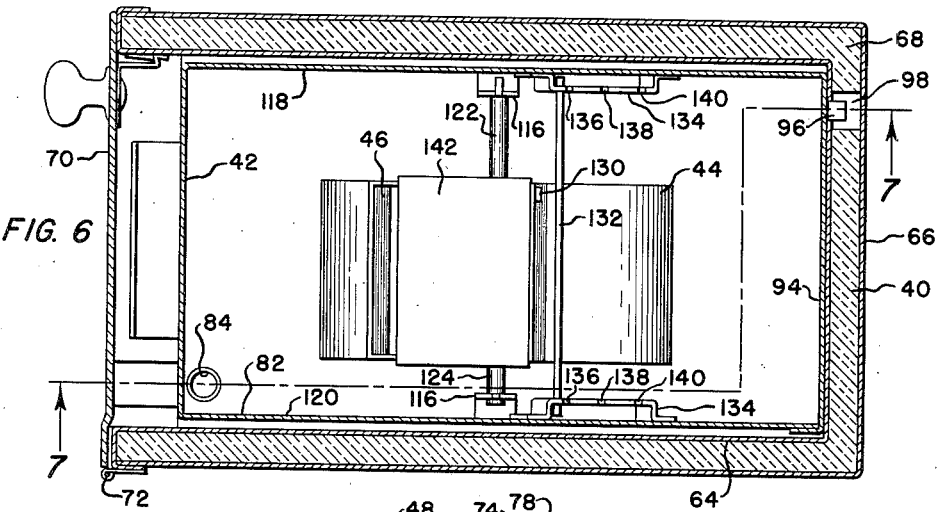
FIG. 6 is a sectional view of the coffee receiving tank and the cabinet therefor, the section being taken along lines 6—6 of FIG. 7.

Referring more in detail to the drawings and particularly to FIG. 1, the machine 20 includes a framework 22 including a base 24. The base supports the brewer 26. The upright 28 of the frame 22 supports a coffee bean hopper 30, a coffee grinder 32, connected with the hopper by a pipe 34. The outlet 36 of the grinder 32 is connected with the brewer 26 by a chute 38. An insulated cabinet 40 is carried by the upright framework 28 above the hopper 30. A brewed coffee storage tank 42 (for instance, see FIGS. 6 and 7), is carried within the cabinet 40. A pivotally mounted container 44 is carried within the tank 42 having an inlet opening 46 which is arranged to receive brewed coffee from a conduit 48. The lower end of this conduit is connected to the outlet port 50 of the brewer 26 (see FIG. 4) through a fitting 52. Hot water is delivered to the water inlet port 54 of the brewer 26 through a conduit 56 and the flow of water through the conduit 56 is controlled by a valve 58, the pipe leading to the valve being shown at 60. This valve is controlled by a solenoid 62.

Referring more in detail to the drawings, and more particularly to FIGS. 6 to 9 inclusive, the cabinet 40 includes inner and outer sheet metal walls 64 and 66 and insulation 68 is disposed between these walls. The front of the cabinet 40 is provided with a door 70 hinged as at 72. An opening is disposed in the top wall 76 of the cabinet and a switch arm 78 extends through this opening and into the tank. The top wall 76 is also provided with an opening 80 for receiving the conduit 48 for brewed coffee.

The tank 42 includes a bottom wall 82 provided with an outlet pipe 84, through which the brewed coffee is withdrawn. The bottom of this tank 82 is spaced from the bottom wall 86 of the cabinet and an electric heater 88 is suitably attached to the bottom wall 82. This heater is connected with wires 90 and 92. The back wall 94 of tank 42 is provided with a nipple 96 through which excessive coffee may be drained in the event of failure of the control mechanism. This nipple leads to the space 98 between the inner wall 100 and the outer wall 102 of the rear wall of the cabinet 40. The space 98 is provided by spacing portions of the insulation from one another as is more clearly shown in FIG. 6. This space is connected by a pipe 104 to drain. The tank 42 is provided with a removable cover 106 having an opening 108 (see FIG. 7), directly below the end of conduit 48 so that brewed coffee can pass from conduit 48 directly into the tank 42. The bottom 82 of the tank 42 is spaced from the bottom wall of the cabinet 86 by front leg 110 and rear legs 112. The pipe 84 is connected with a flexible tube 114 to a coffee vending machine. When the door 70 is open the tank 42 and its contents can be withdrawn from the cabinet 40.

Control means including the container 44 is pivotally mounted within the tank 42. For this purpose stirrups 116 are carried by the side walls 118 and 120 of the tank 42. The container 44 carries aligned axles 122 and 124 which are pivotally mounted upon the stirrups 116 whereby the container 44 is pivotally mounted for free swinging movement. The container 44 is provided with a hollow extension 126 which forms the receiving mouth or inlet opening 46 for the container. This mouth or inlet opening is disposed directly below the bottom of conduit 48 and opening 108 in the tank, cover 106, so that the container receives all the coffee flowing through conduit 48.

A weight 128 is disposed diametrically opposite from the center of the inlet opening 46. This weight tends to hold the container 44 in the position shown in FIG. 7, there being a bracket 130 attached to the extension 126 and engaging the switch arm 78, to limit the clockwise movement of the tank as viewed in FIG. 7. The volume of coffee that can be contained in the extension 126 has a weight greater than the weight 128. That is, when the container 44 is empty and while it is being filled, to a predetermined high level in the extension 126, the center of gravity of the control means including the container 44, the weight 128 and the extension 126, is below the pivotal point of the container 44, and, after the level of the liquid in the extension 126 exceeds a predetermined height, the center of gravity of the aforementioned means will be above the pivotal point of the container 44, and consequently the means, including the container 44, the weight 128 and the extension 126, will move in a counterclockwise direction until the weight 128 engages a pin 132, as is shown in FIG. 8. Coffee from the container 44, of course, will dump into the tank 42.

If sufficient coffee is contained within the tank 42 to immerse the entire mouth 46 of container 44, the container 44 will remain in this position, as illustrated in FIGURE 8, until substantially all of the coffee contained therein has drained into the tank 42 and, of course, this will be accomplished by withdrawing coffee from the tank 42. After sufficient coffee is withdrawn from the container 44, that is after the liquid level in the container 44 drops to such a level that the weight of the means on the right side of the pivotal point of the container balances the weight on the left side of the pivotal point, the means including the container 44, the weight 128 and the extension 126 will be rotated in a clockwise direction and will stop in the position shown in FIG. 7 in which bracket 130 moves the switch arm 78 to the right. In its discharge or emptying position, container 44 will discharge brewed coffee only when the level in tank 42 uncovers a portion of mouth 46. Air will then enter mouth 46 to permit some of the brewed coffeee therein to flow out and bring the level of the coffee in tank 44 above mouth 46. In this way a substantially constant or predetermined reserve level of coffee is maintained in tank 42.

The quantity of coffee that can be contained in tank 42 can be adjusted by regulating the degree of counterclockwise movement that is permitted the container 44. Any suitable means may be used for limiting the counterclockwise movement of container 44 and for adjusting the degree of movement. In the instant case I have provided brackets 134 on opposite sides of the tank and provided these brackets with a series of notches 136, 138 and 140. The pin or rod 132 can be placed in any of these sockets. In FIG. 8 I have shown the level that is maintained when the pin 132 is in sockets 136, and in FIG. 9 I have shown the level that is maintained when the pin is in sockets 140. A cap or partial cover 142 determines the width of the inlet mouth 46 of the container 44. This cap is removable for the purpose of cleansing the interior of the container 44.

The switch arm 78 is normally biased toward the left as viewed in FIG. 7 whereby to maintain contact, actuated thereby in contact with a stationary contact 146, and when the container is moved to the position shown in FIG. 7, that is wherein the bracket 130 moves the switch arm 78 to the right, contact 144 is separated from contact 146 and is brought into engagement with contact 148 for the purposes hereinafter described. The movement of contact 144 into engagement with contact 148 starts the brewer motor 150 to start the sequence of operations necessary for brewing coffee.

The brewer 26 includes a cylinder 152. This cylinder has a fresh ground coffee inlet port 154 connected with the lower end of chute 38. To the left of port 154 (as viewed in FIG. 4), the cylinder is provided with the water inlet port 54 and the vertically aligned outlet port 50, and a spent coffee grounds outlet port 156 disposed to the left of brewed coffee outlet port 50. Two axially aligned pistons 158 and 160 are disposed within the cylinder 152 and are held in spaced relationship with one another by a spool 162. Spool 162 is connected to piston 158 by a screw 164 and a piston 160 is connected to spool 162 by a threaded shank 166 of a coupling 168. Coupling 168 is connected to a drive wheel 170 of the motor 150 by a pin, 172, a connecting rod 174 and a wrist pin 176. As the motor 150 rotates, it will cause reciprocation of the pistons 158 and 160. An arcuately shaped valve 178 is carried by the right side of piston 160 and is secured thereto by screws 180. This valve registers with the port 154 to control the flow of ground coffee into the cylinder. The pistons are each provided with rubber O-rings 182 in the periphery thereof.

The pistons, and consequently the space between the same, assume different positions or situations as they are being moved by the motor. After a brewing operation, the pistons are moved toward their extreme left position, and the space between the same is in open communication with the hot water outlet port 54 and the flushing or spent coffee outlet port 156. When the pistons reach or substantially reach their extreme left position the motor 150 will be stopped and the water valve will be closed, as will be explained hereinafter in more detail. When the switch arm 78 actuates contact 144 to separate the same from contact 146 and engage contact 148, that is, when the container 44 is moved from the position shown in either of FIGS. 8 or 9, to the position shown in FIG. 7, the motor 150 will be actuated, the pistons 158 and 160 will be moved to the right, and valve 178 will uncover the fresh coffee inlet port 154 and the motor will continue to operate to move the pistons to the extreme right and then again to the left to a position in which the piston 158 will be moved to the left of water inlet port 54 and brewed coffee outlet port 50, and the valve 178 will also be moved to a position in which port 154 is closed. The pistons will remain in this station during the entire brewing operation. After the motor has stopped, so as to maintain the pistons 158 and 160 in the brewing position, the solenoid valve 58 will be opened to permit hot water to flow in the space now containing the ground coffee to thus start the brewing operation. The fitting 52 is provided with a screen (not shown). Any suitable means may be interposed in the water line so as to limit the flow of water to the brewing space to an amount necessary to brew the coffee to the desired strength.

Figure 7:
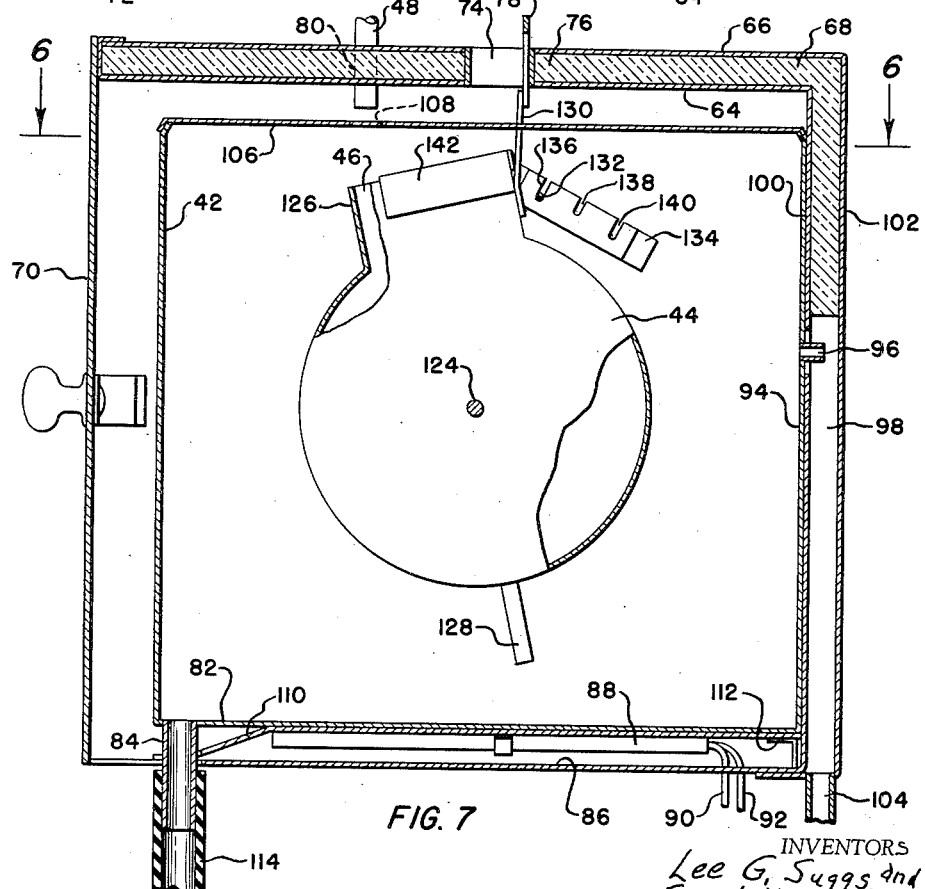
FIG. 7 is a sectional view taken along line 7—7 of FIG. 6.
Figure 8:
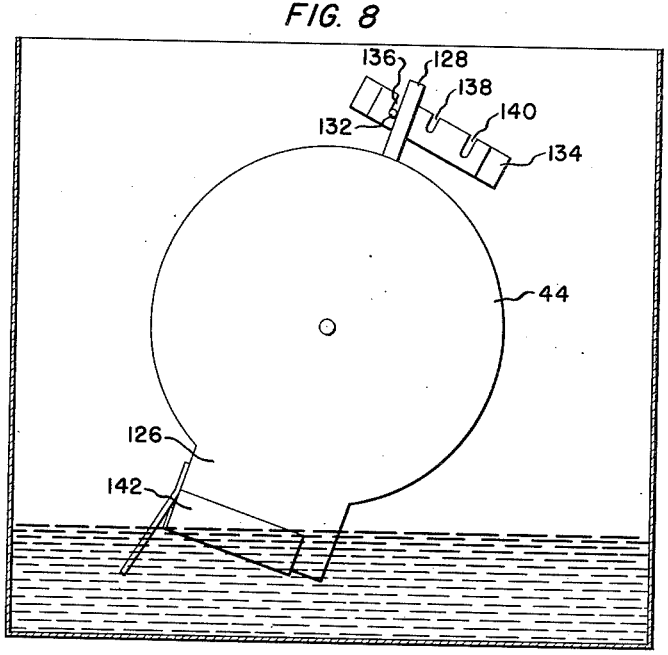
FIG. 8 is a diagrammatic view of the coffee receiving container and tank showing the container in upset position.
Figure 9:
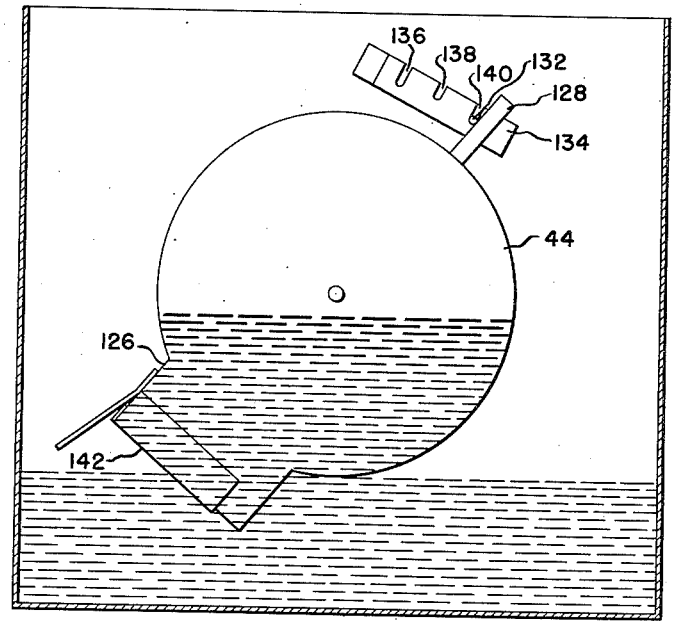
FIG. 9 is a view similar to FIG. 8 but showing the container in another adjusted position.

After a predetermined quantity of coffee is brewed, that is an amount necessary to upset the container 44, and when it moves from the position shown in FIG. 7 to the position shown in FIGS. 8 or 9, the switch arm 78, which is biased toward the left will separate contact 144 from contact 148 and make contact with contact 146. When this occurs the motor 150 will be started again and will move the pistons 158 and 160 toward the left whereby piston 160 will push the spent coffee grounds through the spent coffee port 156. Water will continue to flow through port 54 during this phase of the operation so as to assist in removing the spent coffee grounds. When the pistons 158 and 160 have been moved to the extreme left position a cam at 186 on the driving wheel 170 will actuate a set of contacts to again stop the motor and cause the solenoid 62 to be deenergized and thereby close the valve 58.

The cylinder 152 of the brewer 26 is supported by a frame 188 including a base 190 and an upright 192. This base is reinforced by an angular web 194 formed integrally with the base 190 and the upright 192. A strap 196 surrounds the right end of the cylinder and this strap secures the cylinder 152 to the frame upright 192 by the screws 197. A vertically extending chute 198 is secured to the extreme left end of the cylinder 152 in any suitable manner. The upper end of this chute registers with the flushing port 156 of the brewer, and registers with an opening 199 in the base 190. The spent coffee is discharged through this chute and may be caught by a bucket or the like disposed below the opening 199.

The motor 150 is suitably secured to the horizontal leg 200 of an L shaped bracket 202, the leg 204 thereof being secured to the frame by screws 206.

The control circuit is shown in FIG. 10. One side of the main is indicated at 210 and the other side at 212. Contacts 144, 146 and 148, and switch arm 78, are all part of a Micro switch 214. When the container 44 is moved to upright position and causes switch arm 78 to move contact 144 into engagement with contact 148, a circuit is completed as follows: Main 210, wire 216, brewer motor 150, wire 218, movable contact 144, stationary contact 148, wire 220, stationary contact 222 of a Micro switch 224, movable contact 226 of the Micro switch 224 and main 212. This will start the motor 150 into operation and the pistons 158 and 160 will be moved from the extreme left position to the extreme right position and then again to the left so that in this left position the space between the pistons 158 and 160 will register with the water inlet port 54 and the brewed coffee outlet 50, but is isolated from the flushing port 156. In other words the piston 158 is slightly to the left of the brew outlet port 50 in the brewing position. At this time the cam 186 will move the switch arm 228 carrying the roller 230 so as to separate contact 226 from contact 222 and complete the circuit between movable contact 226 and stationary contact 232 of Micro switch 224. The closing of contact 226 on contact 232 will complete the circuit through the solenoid winding 234 of the solenoid 62. The circuit is as follows: Wires 210 and 216, wire 236, winding 234, wires 236 and 238, stationary contact 232 of Micro switch 224, movable contact 226, and thence to main 212. The solenoid coil 240 will then be actuated to move valve member 242 of valve 58 permitting hot water to flow from the water main 60 through valve 58, pipe 56 and port 54 of the brewer.

It will be understood that as the space between the pistons 158 and 160 is moved to the right and then to the left while registering with port 154, ground coffee will pass from the chute 38 through the port 154 into the space between the pistons.

Simultaneously with the closing of movable contact 144 on contact 148 of Micro switch 214, a parallel circuit will be established through a grinder timer motor 244. This circuit is as follows: Main 210, wire 246, grinder timer motor 244, wire 248, movable contact 250, of a switch 252, stationary contact 254, wires 256 and 218, contacts 144 and 148, wire 220, stationary contact 222 and movable contact 226, and thence to the main 212. The switch 252 is actuated by a cam which is driven by the timer motor 244 by a shaft 260. Directly after the timer motor 244 is started the cam 258 engages a cam follower 262 to move a pin 264 to the right as viewed in FIG. 10. This pin is suitably carried by a spring 266 and normally biased thereby to the left. The spring is carried by a stationary element 268. Normally contact 250 is spring biased to the left into engagement with contact 254. The pin 264 is arranged to engage movable contact 250 and force same into engagement with a contact 270 of switch 252. The separation of contact 250 from 254 only momentarily interrupts the timer motor circuit since immediately upon separation of said contacts, contact 250 will engage contact 270 to complete a holding circuit as follows: Wires 210 and 246, timer motor 244, wire 248, contacts 250 and 270, and wire 272 connected with main 212. The pin 264 continues to press to the right so that contact 270 will engage a contact 274 of switch 254 to close a coffee grinder motor circuit as follows: Wires 210, 246, 276, grinder motor 278, wire 280, contacts 274 and 270, and wire 272 to the main 212. The circuits to the timer motor and the grinder motor will remain as just described as long as cam follower 262 is riding upon the surface 282 of the cam 258. When the cam 258 is moved so that the cam follower rides upon the smaller radius cam surface 284, pin 264 will be moved to the left sufficiently to permit contact 270, which is momentarily biased to the left, to separate from contact 274 and thereby interrupt the grinder motor circuit, stopping the grinding of the coffee beans. Contact 250 will remain in contact with contact 270 to maintain the holding circuit for the grinder timer motor until the cam moves so that its surface 286 is engaged by cam follower 262, permitting contact 250, which is normally biased to the left, to reengage with contact 254 and maintain the grinder timer motor circuit. The grinder timer motor circuit is maintained during a period from the time that the cam moves from the point 288 to substantially the point 290, through the circuit including contacts 226 and 222 of switch 224. At this time the brewer motor and the grinder timer motor are so synchronized that the brewer motor cam 186 will, in addition to interrupting the brewer motor circuit 150, also interrupt the circuit for the grinder timer motor 224.

The system will remain in this state, that is, the grinder timer motor is stationary, the brewer motor is stationary and the valve 242 is open, during the entire brewing operation. After a predetermined quantity of brewed coffee is delivered to the container 44, container 44 will upset causing contact 144 to be separated from contact 148 and cause the contact 144 to engage contact 146. The engagement of contact 144 with contact 146 will complete the following circuit to the brewer motor 150 as follows: Wires 210 and 216, motor 150, wire 218, contacts 144 and 146, wires 292 and 238, contacts 232 and 226 of switch 224, and the main 212. It will be observed that at this time the solenoid coil is maintained energized and the valve 242 will be open, the circuit for the solenoid coil 234 being as described heretofore. When the brewer motor is again energized the pistons 158 and 160 will be moved to the left and the piston 160 will force the spent grounds to the left, toward the port 156 and discharge chute 198 as will be seen from the position of pin 172 and rod 174, piston 160 will stop slightly to the right of port 156. Simultaneously the water flow is maintained to assist in flushing the spent grounds from the cylinder 152.

When the pistons 158 and 160 reach their extreme left position, the cam 186 will be in such position as to separate contact 226 from 232 to thus interrupt the circuit to the solenoid coil 234, at which time valve 242 will be closed and stop the flow of water. Also the brewer motor circuit will be interrupted by the separation of these contacts, and since contact 144 is out of contact with contact 148, current cannot flow to either the brewer motor 150 or the grinder timer motor 244.

Any suitable coin-controlled dispenser may be utilized for controlling the flow of brewed coffee through the pipe 114.

While the form of embodiment herein shown and described constitutes a preferred form, it is to be understood that other forms may be adopted falling within the scope of the claims that follow.

We claim:

1. In a liquid dispensing machine, in combination, conduit means for conveying freshly prepared liquid, said conduit means having an outlet; a tank having an opening to atmospheric pressure; a body of prepared liquid filling said tank to a predetermined reserve level; and a container pivotally supported within said tank for pivotal movement between a filling position and an emptying position, said container having a single opening to atmospheric pressure, said opening being alignable with the outlet of said conduit means to receive prepared liquid when said container is in said filling position, said opening being immersible in said body of prepared liquid below said predetermined reserve level when said container is in said emptying position, said container being weighted for pivotal movement to locate said opening of said container in alignment with said outlet of said conduit means when said container is substantially empty, and locate said opening of said container below said predetermined reserve level when said container is substantially full, said opening of said container being relatively small compared to the volume of said container whereby prepared liquid is trapped within said container in said emptying position and is discharged only when the level of said body of prepared liquid in said tank drops below said predetermined reserve level and into communication with said opening in said container, the discharge of prepared liquid terminating when the level of said body of prepared liquid substantially returns to said predetermined reserve level out of communication with said opening in said container.

2. A device as defined in claim 1, and characterized to include stop means to effect engagement between said tank and said container at a point during pivotal movement of said container to thereby establish a first said emptying position, said stop means being adjustable to effect said engagement at a different point to thereby establish a second said emptying position whereby the height of said predetermined reserve level may be adjusted.

3. A device as defined in claim 1, and characterized to include adjusting means carried by said tank, a member supported by said adjusting means, and an element carried by said container, said member and said element being engageable upon pivotal movement of said container to thereby establish the location of said emptying position, said adjusting means being operative to vary the position of said member to thereby vary the location of said emptying position.

4. In an automatic coffee brewing machine, in combination, a storage tank from which brewed coffee may be withdrawn, said tank having an inlet for receipt of brewed coffee, said inlet being open to atmospheric pressure; a body of brewed coffee filling said tank to a predetermined reserve level; a container; pivot means carried by said tank and said container whereby said container is pivotable in said tank about the axis of said pivot means between a filling position and an emptying position, said container having a single opening for receiving brewed coffee from said inlet when said container is in said filling position, said opening being open to atmospheric pressure, said opening being immersible in said body of brewed coffee below said predetermined reserve level when said container is in said emptying position; means actuable for discharging brewed coffee into said inlet; and an element carried by said container and engageable with said last mentioned means upon movement of said container to said filling position; said container having a center of gravity above said axis of said pivot means when said container is substantially empty and in said emptying position, and a center of gravity above said axis when said container is substantially full and in said filling position whereby said container tends to pivot to said filling position and to said emptying position, respectively, said opening of said container being relatively small compared to the volume of said container whereby brewed coffee is trapped within said container in said emptying position and is discharged only when the level of said body of brewed coffee in said tank drops below said predetermined reserve level into communication with said opening in said container, the discharge of brewed coffee terminating when the level of said body of brewed coffee substantially returns to said predetermined reserve level out of communication with said opening in said container.

5. A device as defined in claim 4, and characterized to include stop means to effect engagement between said tank and said container at a point during pivotal movement of said container to thereby establish a first said emptying position, said stop means being adjustable to effect said engagement at a different point to thereby establish a second said emptying position whereby the height of said predetermined reserve level may be adjusted.

6. A device as defined in claim 4, and characterized to include adjusting means carried by said tank, a member supported by said adjusting means, and an element carried by said container, said member and said element being engageable upon pivotal movement of said container to thereby establish the location of said emptying position, said adjusting means being operative to vary the position of said member to thereby vary the location of said emptying position.

References Cited in the file of this patent

UNITED STATES PATENTS

| | | |
|---|---|---|
| 74,937 | Petsch | Feb. 25, 1868 |
| 434,702 | Cooley et al. | Aug. 19, 1890 |
| 448,800 | Mentel | Mar. 24, 1891 |
| 565,219 | Richards | Aug. 4, 1896 |
| 661,171 | Gautier | Nov. 6, 1900 |
| 1,101,363 | Walkup | June 23, 1914 |
| 1,805,159 | Bauer et al. | May 12, 1931 |
| 1,869,720 | Strand et al. | Aug. 2, 1932 |
| 1,882,226 | Mezzapesa | Oct. 11, 1932 |
| 2,188,040 | Furby | Jan. 23, 1940 |
| 2,387,871 | Baumann | Oct. 30, 1945 |
| 2,517,073 | Alvarez | Aug. 1, 1950 |
| 2,524,261 | Kaminky | Oct. 3, 1950 |
| 2,533,930 | Harr | Dec. 12, 1950 |
| 2,631,601 | Dillon | Mar. 17, 1953 |
| 2,646,067 | Smith | July 21, 1953 |
| 2,660,193 | Hanney | Nov. 24, 1953 |
| 2,887,029 | Druce | May 19, 1959 |

FOREIGN PATENTS

| | | |
|---|---|---|
| 234,550 | Germany | May 15, 1911 |
| 335,110 | Great Britain | Nov. 11, 1929 |